Feb. 6, 1934.  R. J. HORLACHER  1,946,072
ARTIFICIAL HORIZON
Filed Dec. 10, 1931  2 Sheets-Sheet 1
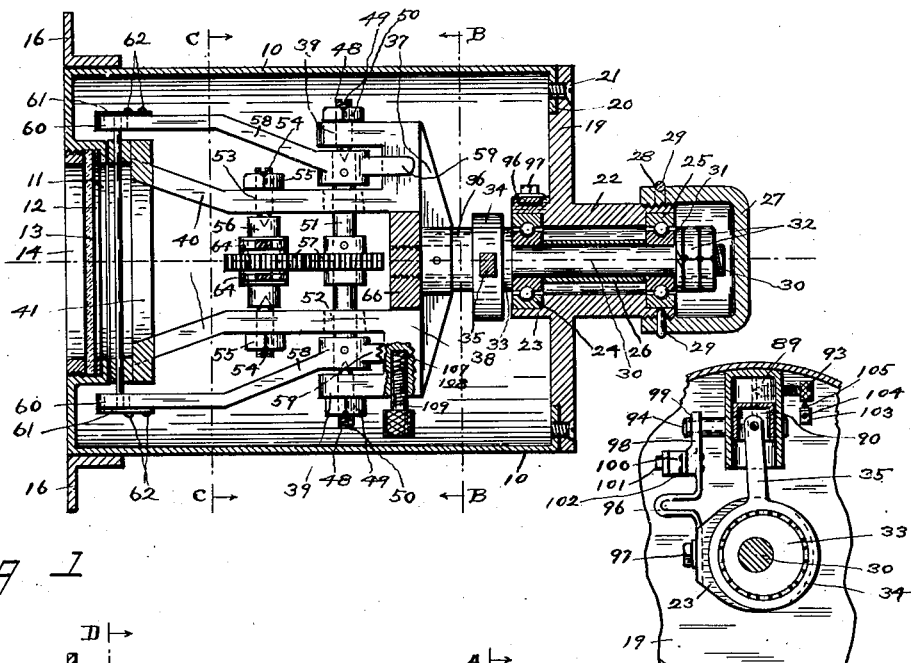
Fig. 1
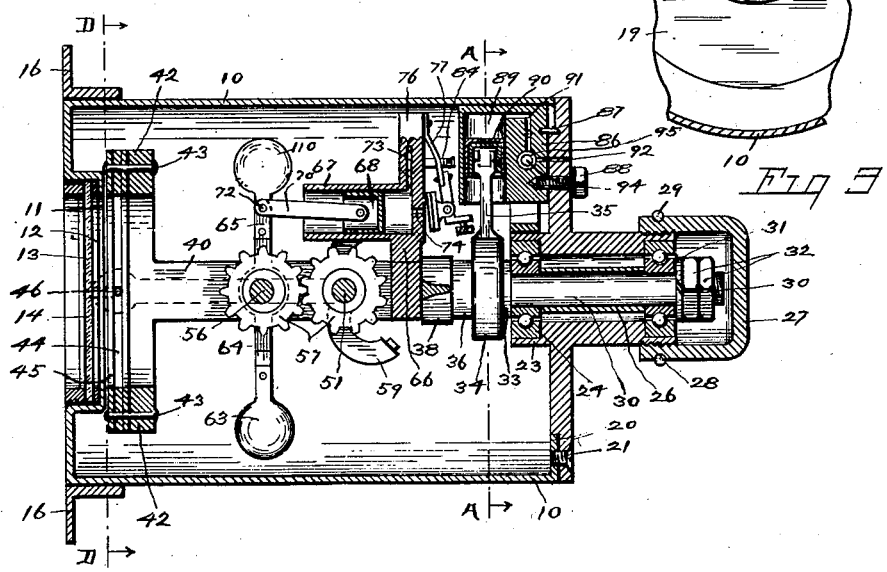
Fig. 2
Fig. 3
Inventor
Robert J. Horlacher.
By John P. Thompson
Attorney

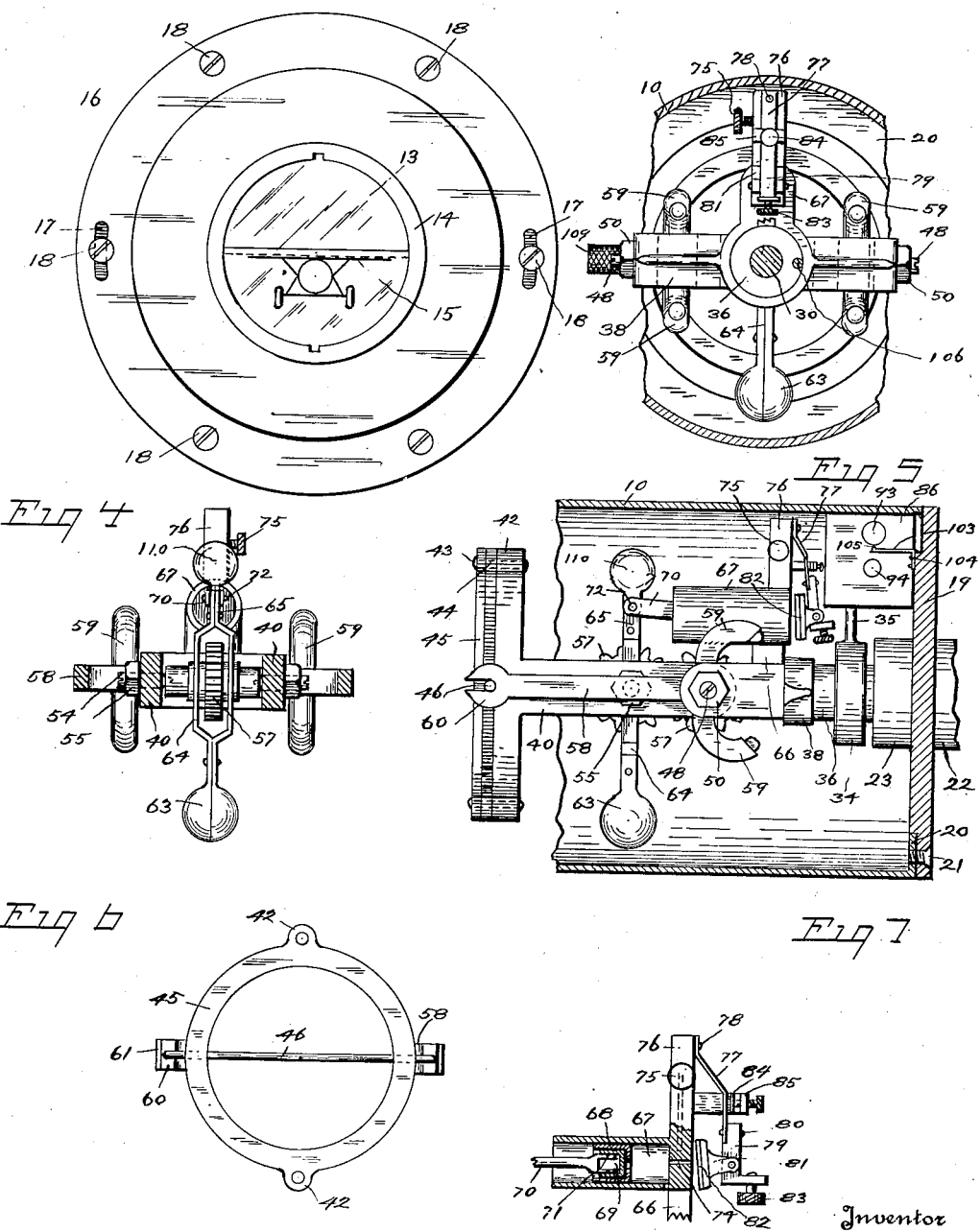

Patented Feb. 6, 1934

1,946,072

UNITED STATES PATENT OFFICE 1,946,072

ARTIFICIAL HORIZON

Robert J. Horlacher, Poughkeepsie, N. Y.

Application December 10, 1931
Serial No. 580,120

5 Claims. (Cl. 33—220)

This invention relates to an artificial horizon of that class which is employed on aeroplanes or the like to provide an instrument which shall take the place of the true horizon, and thus enable the pilot to navigate when due to weather conditions he is unable to see the true horizon.

While I am aware that instruments have been devised which will to a certain extent accomplish this object, they are operated on the principle of the gyroscope, or are driven or operated by an air jet through a venturi, or by other outside means, and such instruments are unreliable, depending as they do for their operation upon the forward movement of the plane and its speed in taking off or in landing, and further in such a design of instrument many moving parts are required which tend to produce wear and thus inaccuracy.

Also in the type which employs a venturi or other means for producing an air jet, it has been found that in storms, the air piping will become clogged thus putting the instrument out of commission, as will also be the case if any leaks take place in the piping or from other causes.

It has therefore been found that such an instrument should be self-contained and not depend for its operation upon any outside means, but should be mounted upon the instrument board in a permanent manner and require no further attention, and that such an instrument should include a transparent dial having thereon a figure to represent the aeroplane, and should contain an indicating means which will coact therewith to show on the dial the position of the plane with respect to the horizon.

The object of the present invention is to provide an instrument for this purpose that shall be simple of construction, durable and efficient, containing few parts and those of rugged design.

Another object of the invention is to provide such an instrument that will indicate the true horizon at all times and under all conditions, and the relation or position of the plane to the true horizon; and an instrument that shall be self-contained and not depend upon any outside accessories or forces for its operation.

Still another object is to provide an instrument that shall be operated by gravity through the movement of a pendulum contained within the instrument, which is sealed to protect the same from moisture and dust, there being no moving parts to require lubrication.

A further object of the invention is to provide in an instrument of this class an automatic checking or dampening means to control the movement of the pendulum, both for side roll and banking as well as in climbing or descending and for sudden acceleration forces which would tend to make the instrument flutter and not give an instantaneous and accurate reading.

Another object is to provide such an instrument that will not be unduly effected when mounted upon an airship by the movement caused by acceleration pressure due to starting, stopping, turning or other movements, but will under all conditions show the relation or position of the ship to the true horizon.

With these and other objects in view, my invention consists in certain construction and combination of parts as will hereinafter be fully described and claimed and further illustrated in the accompanying drawings in which like figures of reference refer to corresponding parts in all of the views, but it is understood that slight changes may be made without departing from the spirit of the invention.

In the drawings:—

Figure 1 shows a top plan view of the instrument, partly in section.

Figure 2 shows a side elevation of the device, also in section.

Figure 3 shows a partial sectional view of one of the dampers and its automatic control, taken on the line A—A of Figure 2.

Figure 4 shows a front view of the instrument as mounted on the instrument board, and with the indicating means in a normal position, indicating that the plane is true with the horizon.

Figure 5 is a detail view, partly in section, and taken on the line B—B of Figure 1.

Figure 6 shows a sectional view taken on the line C—C of Figure 1.

Figure 7 shows a partial side elevation also in section and with some of the parts removed.

Figure 8 shows a cross sectional view taken on the line D—D of Figure 2.

Figure 9 shows a detailed view partly in section of the other dampener and its automatic control.

While I have herewith shown and described the preferred construction and design of my invention, changes may be made in the shape, minor details and materials employed as may be found desirable.

Referring to the drawings:—

The device comprises a tubular casing 10 which is inwardly flanged at the front end to form an opening 11 within which is mounted upon a gasket 12 a glass or dial 13 by a threaded bezel ring 14; the glass or dial 13 being marked with an outline of an aeroplane 15 or other suitable indicating means to represent the aeroplane on the glass dial and in cooperation with the indicating means represent the horizon and to show the deviation of the plane from the true horizon.

The front end of the instrument is also provided with a mounting flange 16 which is secured thereto in some suitable manner, and which is provided with a series of holes 17 for the attaching screws 18; two or more of the holes being elongated, so that the instrument may be adjusted on the instrument board before being permanently secured while the plane is at rest upon a level surface.

The rear end of the casing 10 is provided with an end plate 19 secured to the flange 20 of the casing 10 by the screws 21, and which is formed with a central or axial bearing member 22 extending outwardly from the plate 19, and an inner bearing boss 23 extending inwardly therefrom; said member 22 being provided with the two ball bearings 24 and 25 which are spaced apart by the spacing tube 26; the outer end of the member 22 being threaded and provided with a cap 27.

Said cap 27 is formed with an encircling groove 28 within which is placed a locking ring 29, having a bent end adapted to enter any one of a series of radial holes in the wall of the member 22, for the purpose of preventing the loosening of the cap 27.

Within the bearings 24 and 25 is rotatably mounted a shaft 30, the rear end of which is threaded and secured in contact with the inner race of the bearing 25 by a lock washer 31 and nuts 32; while just forward of the bearing 24, said shaft 30 has secured thereon by a pin or other suitable means an eccentric member 33 which also forms the inner race of a ball bearing 34, the outer race of which is formed with an arm 35, the use of which will be explained later in detail.

The inner end of the shaft 30 is threaded and secured in the boss 36 which is formed on the head 37 of the frame 38; said yoke 38 being provided with two short arms 39 and the two inner arms 40 which terminate in the ring 41; said ring 41 being formed with the two ears 42 to which are secured by the rivets 43, the spacer blocks 44 and the outer ring 45; while between the ring 41 and the ring 45 is mounted a rod 46, which has free vertical movement between said rings for the purpose hereinafter set forth.

The arms 39 are formed with the alined threaded holes within which are threaded the conical pins 48, which are adjusted by a screw driver slot 49, and which are locked in place by the jam nuts 50, and between said pivot pins 48 is mounted a shaft 51 with free rotary movement thereon; the inner arms 40 being formed with the openings 52 through which said shaft 51 may pass.

At a suitable distance forward of the openings 52, the arms 40 are provided with alined holes 53 within which are threaded the conical bearing pins 54, which are locked by the jam nuts 55; while a short shaft 56 is mounted on said pins 54 in a freely rotatable manner, and on this shaft 56 and the shaft 51 are secured the two intermeshing spur gears 57 which are employed to change the direction of rotation of said shafts.

On the shaft 51 between the arms 40 and 39 are secured the rear portions of the two arms 58 which are formed with the stops 59 which will contact with the head 37 and limit the swing of said arms 58, the forward ends of which are formed with the bifurcated ends 60 which embrace the ends of the rod 46, while end movement of said rod 46 is prevented by the stops 61 which are attached to the arms 58 adjacent their ends by the rivets 62; said rod 46 having free movement within its rings 42 and 45 as actuated by said arms 58.

The pendulum 63 as shown in Figure 6 is formed of two halves making a yoke 64 which embraces the gear 57 and which is attached to the hubs thereof in some suitable manner, and thus to the shaft 56 which is moved by its swing, thus in turn imparting rotary movement to the other gear and so through the shaft 51 to the arms 58. Thus moving the rod 46 with respect to the rings on the arm 40; the upper ends of the yoke 64 terminating in the arm 65.

For dampening the back and forth movement of the pendulum 63 as the plane climbs or dives, a dampener is provided which comprises a member 66 formed on the yoke head 37 and provided with a cylinder 67 parallel with the shaft 30 and within which is mounted a piston 68 attached to a connecting rod 70 by the tits 71; said connecting rod 70 being pivoted to the arm 65 by a pin 72.

Said piston 68 acts on an air cushion formed in the cylinder 67 and the escape of air is regulated by the ports 73 and 74 formed in the walls; the ports 73 and 74 taking care of the amount of air escaping under all normal conditions, and also the intake of air. The port 73 being adjusted by a needlepoint screw 75 threaded into the wall 76, and port 74 by an automatic device, which acts as an inertia damper taking care of acceleration forces and temporarily closing the port 74, and which comprises a spring arm 77 which has one end attached to the wall 76 by the rivets 78, and to the lower end of which it attached the angular piece 79 by the rivets 80; while to said angular piece 79 is pivoted a damper shoe 81 which is faced with fiber or other suitable material 82 for closing the port 74. The angular piece 79 being further provided with an adjustable weight 83, and the spring 77 having its vibration limited by a second damper 84 threaded through a bracket 85 secured to the wall 76, and in this manner, when a sudden surge or acceleration takes place the swing of the inertia damper will close the port 74 thus forcing all of the air in the cylinder to escape through the port 73 and exerting a greater pressure on the piston, while under normal conditions the air escapes through both of the ports 73 and 74.

The inertia damper which provides a means to overcome any forces set up in the instrument by the swing on the pendulum which would tend to give an inaccurate reading due to excessive roll or side slip of the plane and undue acceleration, is similar to the damper already described, and comprises a member 86 which is secured to the back plate 19 by the dowels 87 and the screw 88, and which is formed with a cylinder 89 within which is mounted a piston 90 connected to the rod 35 of the eccentric 34.

This damper is also provided with two air ports 91 and 92; the air port 91 being regulated by the needle valve pin 93 and the port 92 being regulated in an automatic manner by a plunger 94 which is slidably mounted in the member 86 at right angles to the cylinder 89, and which is formed with a circumferential groove 95 between the ends thereof and which when said plunger 94 is in a normal position will register with the port 92 to allow the same to remain open, but when the side roll of the plane takes place or any force acting upon the pendulum to create an acceleration or sudden movement, the plunger 94 will be moved to one side or the other, that is the plunger will be given end movement, thus closing the port 92 and requiring all of the air in the cylinder 89 to escape through the port 91 thus placing more pressure upon the piston and through the eccentric to the shaft 30 thus stabilizing the action of the pendulum.

For operating this plunger 94, a spring arm 96 formed with a spring 96 is attached to the side of the boss 23 by the screw 97 and retained from movement by a groove which is milled in the side of said boss 23, which is also a part of the end plate 19 which is stationary with respect to the plane; and within said groove the spring is held in a rigid manner.

The upper end of said spring is provided with a bifurcated arm 98 which embraces the grooved portion 99 of the plunger 94 in such a manner that the plunger can be moved endwise in either direction against the pressure of said spring arm 96; the arm 98 being also provided with a weight 100 secured thereto by a screw 101; the arm 98 and spring 96 being secured together by the rivets 102.

Also there is provided a ratchet lock for the head of the screw 93 (see Fig. 7), which comprises a spring arm 103 secured to the end plate 19 by the screws 104 and formed with the tit 105 which is in contact with the knurling on said screw head.

The eccentric member 33 is secured to the boss 36 by a pin 106, and for balancing the frame 38 and arms, there is provided a weight 109 threaded into a hole 107 (Figs. 1 and 5) in the head 38 which contains a friction spring 108 to retain said weight in place.

There is also mounted on the upper end of the arms 65 a counterbalance 110 for the weight of the pendulum and which is of less weight than the ball of said pendulum, and which tends to stabilize the action of the pendulum.

The operation of the device is as follows; the instrument having been attached to the instrument board of the plane when the plane is at rest upon a level surface so that the indicating rod 46 is in registry with the wing line of the miniature plane 15 on the glass 13 the device is ready for operation. As the plane rises the pendulum 63 will tend to remain perpendicular at all times and so as the plane rises said pendulum 63 remains in its original position and the casing 10 tilts upward with the plane and by the rotation of the gears 57 the shaft 51 is moved and with it the arms 58 which carry the rod 46 below the wing line of the plane 15. As the plane straightens out in flight the casing will again become level and the rod 46 register with the plane wings 15. When the plane dips the reverse takes place and the rod 46 shows above the wings 15.

For registering the side roll or bank, of the plane, it is seen that the frame composed of the head 38 and the arms 40 with their rings 41 and 45 have no vertical movement, but are free for the casing to revolve around them, the pendulum retaining said frame in a normal position, and as said casing rotates in either direction, so the rod 46 is moved at an angle with respect to the wings 15 showing the position of the plane with respect to the true horizon, and of course the up or down movement of the rod 46 may take place at the same time as the plane goes up and banks, or through other movements.

It will thus be seen that the casing has movement in all directions with respect to the pendulum, and that the movements thereof must be regulated or dampened to stabilize the action of the pendulum and prevent jerky movement, and to accomplish this the back and forward movement of said pendulum with respect to the casing is dampened by the action of the piston 68 in the cylinder 67 acting on the air cushion which has to escape through or be drawn in the ducts 73 and 74, and to care for sudden surges of the plane as in starting or landing, one of these air ducts 74 is provided with the automatic valve 82 which is mounted on the spring arm 77 and which will swing to close the duct 74; which any vibration of said valve which may be caused by the plane or its motive power is prevented by the stop 84 which prevents said vibrations being set up.

To dampen the roll of the casing with respect to the frame, the eccentric on the shaft 30 is provided, which, as the shaft rotates or the casing on the shaft, the piston 90 connected to the rod 35 will reciprocate in the cylinder 89 on an air cushion which has to escape or be drawn in through the ducts 91 and 92, and one of these ducts is provided with the automatic plunger 94 which acts as a valve to close the duct 92 upon a sudden surge of the plane due to roll or bank, and this valve is operated through the spring arm 96 which is weighted and acts in either direction; and to further stabilize the movement of the pendulum the counterweight 110 is provided upon the upper end of the arm 65.

By these devices it will be seen that any force, acceleration or centrifugal motion acting upon the lower weight of the pendulum will also act on the upper and lesser weight 110 and which has less inertia and will thus slowly displace itself in regard to the vertical position, and in cases of sudden acceleration the forces acting upon the pendulum will act upon the inertia regulators and close the ports or air ducts causing the air to travel slower and thus retarding the movement of the pendulum with respect to the casing.

Having thus described my invention, what I claim as new and desire to secure by Letters Patent, is:—

1. A device of the class described, comprising a casing, a window mounted in one end thereof, an indicating mark on said window and in fixed relation thereto, an end plate secured in the other end of said casing, a bearing formed in said plate in axial relation to said casing, a shaft rotatably mounted in said bearing, a frame carried by said shaft having rotary movement only with respect to said window and in axial relation therewith and provided with a guideway, an indicating rod mounted in said guideway and means carried by said frame for moving said indicating rod by the movement of the device in a vertical plane through the axis of said shaft to coact with the indicating mark on the window to indicate the position of the device with respect to the true horizon.

2. An instrument of the class described, comprising a casing for rigid attachment to a plane, a window secured in one end thereof, a bearing in the other end thereof in axial relation to said window, an aeroplane indicating mark carried by said window, a shaft mounted in said bearing and having free rotary movement, a frame carried by said shaft, the forward end of said frame provided with a guide way adjacent the aeroplane indicating mark, a pair of shafts mounted in said frame, intermeshing gears secured to said shafts, arms secured to one of said shafts and adapted to have movement with respect to said frame, an indicating rod carried by said arms and mounted in said guideway, a pendulum secured to the other shaft and adapted by the movement of said casing as actuated by the plane to move said indicating rod in a vertical plane with respect to the aeroplane indicating mark on the window, and means for limiting the movement of said arms, and means for dampening the movement of said pendulum.

3. In an instrument of the class described, comprising a casing designed to be attached to a plane, a mark carried by said casing, a movable indicating rod mounted within said casing adjacent said mark, means for moving said indicating means, comprising a pendulum, means for dampening the movement of said pendulum comprising an air cushion having air ducts, and means for automatically regulating said dampening means comprising means for controlling the flow of air through said ducts and actuated by accelerated movement of the plane.

4. In an instrument of the class described, comprising a casing designed to be attached to a plane, a mark in the form of an aeroplane carried by said casing, a movable indicating rod mounted within said casing adjacent said mark, means for moving said indicating means, comprising a pendulum, means for dampening the movement of said pendulum comprising an air cushion having air ducts, and means for automatically regulating said dampening means comprising means for controlling the flow of air through said ducts comprising an inertia valve.

5. In an instrument of the class described, comprising a casing designed to be attached to a plane, a dial carried by said casing, an indicating mark in the form of an aeroplane on said dial, a movable indicating rod mounted within said casing adjacent said mark, means for moving said indicating rod comprising a pendulum actuated by the movement of the plane, means for dampening the movement of said pendulum comprising an air cushion provided with an air duct, and an inertia weighted plunger adapted to regulate the passage of air through said ducts, and a movable weighted adjusting screw adapted to regulate the zero reading of said instrument.

ROBERT J. HORLACHER.